US012630289B1

(12) United States Patent
Hirshman

(10) Patent No.: US 12,630,289 B1
(45) Date of Patent: May 19, 2026

(54) ELECTRICALLY POWERED STORE DEPLOYMENT SYSTEM FOR AIRCRAFT AND RELATED METHODS

(71) Applicant: Eagle Technology, LLC, Melbourne, FL (US)

(72) Inventor: Brian S. Hirshman, Plainview, NY (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 19/180,020

(22) Filed: Apr. 15, 2025

(51) Int. Cl.
B64D 1/02 (2006.01)

(52) U.S. Cl.
CPC ...................................... B64D 1/02 (2013.01)

(58) Field of Classification Search
CPC ....................................................... B64D 1/02
See application file for complete search history.

(56) References Cited

U.S. PATENT DOCUMENTS

| | | | | |
|---|---|---|---|---|
| 4,702,145 A * | 10/1987 | Kannapell | ................ | B64D 1/06 |
| | | | | 89/1.801 |
| 7,648,104 B1 * | 1/2010 | Jakubowski, Jr. | ....... | B64D 1/04 |
| | | | | 89/1.53 |
| 8,127,655 B1 * | 3/2012 | Kay | ........................ | B64D 1/06 |
| | | | | 89/1.54 |

| | | | | |
|---|---|---|---|---|
| 11,143,489 B2 * | 10/2021 | Campbell | ............... | F41F 3/065 |
| 11,279,483 B2 * | 3/2022 | Provenza | ................. | B64D 1/04 |
| 11,465,744 B2 * | 10/2022 | Hamelin | ................. | B64D 7/08 |
| 11,505,318 B2 * | 11/2022 | Keller | ....................... | B64D 1/06 |
| 11,858,634 B2 * | 1/2024 | Tobias | ..................... | B64D 1/12 |
| 2016/0083089 A1 * | 3/2016 | Ray | .......................... | F41F 3/06 |
| | | | | 244/137.4 |

FOREIGN PATENT DOCUMENTS

WO        2016064457 A1        4/2016

OTHER PUBLICATIONS

Ailneni et al.; "Aircraft External Stores Ejection Acceleration Modeling from Store Pit Drop Tests;" 2023 3rd International Conference on Range Technology; Feb. 2023; 12 pages.

* cited by examiner

*Primary Examiner* — Tye William Abell
(74) *Attorney, Agent, or Firm* — ALLEN, DYER, DOPPELT, + GILCHRIST, P.A.

(57) ABSTRACT

An electrically powered store deployment system for an aircraft may include a housing to be carried by the aircraft, and a release arrangement carried by the housing and configured to selectively release a store from the aircraft. The store deployment system may also include an ejection arrangement carried by the housing and configured to selectively eject the store away from the aircraft upon release of the store by the release arrangement. The ejection arrangement may include at least one electric motor carried by the housing, and at least one ejector piston carried by the housing and movable between stored and ejection positions responsive to the at least one electric motor.

25 Claims, 10 Drawing Sheets

ELECTRICALLY POWERED STORE DEPLOYMENT SYSTEM FOR AIRCRAFT AND RELATED METHODS

TECHNICAL FIELD

The present invention relates to the field of aviation, and, more particularly, to aircraft store deployment and related methods.

BACKGROUND

An aircraft mounted store deployment system may typically use an ejection force exerted onto the store during a release. The ejection force may be induced by powering one or more ejection pistons that push on the store during a release. One approach to powering the ejection piston is with a pyrotechnic ejection. During a pyrotechnic ejection, an explosive may be ignited to generate pressure to thereby expand the ejection piston.

Another approach to powering an ejection piston is through a pneumatic ejection. During a pneumatic ejection, compressed gas is expanded to generate pressure, which expands the ejection piston. An exemplary pneumatic ejection store deployment system may include any of the BRU-Series pneumatic ejection systems provided by L3Harris® of Melbourne, Florida, for example.

SUMMARY

An electrically powered store deployment system for an aircraft may include a housing to be carried by the aircraft, and a release arrangement carried by the housing and configured to selectively release a store from the aircraft. The electrically powered store deployment system may also include an ejection arrangement carried by the housing and configured to selectively eject the store away from the aircraft upon release of the store by the release arrangement. The ejection arrangement may include at least one electric motor carried by the housing, and at least one ejector piston carried by the housing and movable between stored and ejection positions responsive to the at least one electric motor.

The at least one electric motor may include at least one rotary electric motor. The at least one ejector piston may include a toothed-shaft and an enlarged head coupled thereto, for example. The ejection arrangement may include a drive gear engaging the toothed-shaft, and a drive belt coupled between the at least one rotary electric motor and the drive gear. The at least one ejector piston may include a pair of ejector pistons, for example, and the at least one rotary electric motor may comprise a pair of rotary electric motors, in some embodiments.

The at least one electric motor may include at least one linear electric motor, for example, in other embodiments. The at least one ejector piston may include a pair of ejector pistons. The at least one linear electric motor may comprise a single linear electric motor, for example. The single linear motor may include a fixed track and a movable shuttle carried thereby, for example.

The at least one piston may include a toothed-shaft and an enlarged head coupled thereto. The ejection arrangement may include a respective drive gear engaging each corresponding toothed-shaft, and a respective pulley arrangement adjacent each opposing end of the fixed track and coupled to each corresponding drive gear. The ejection arrangement may also include a respective drive belt coupled between the movable shuttle and each corresponding pulley arrangement, for example.

The electrically powered store deployment system may include a controller coupled to the release arrangement and the ejection arrangement. The store may include a store body and at least one hook carried by the store body, and the release arrangement may be configured to engage and release the at least one hook, for example.

A method aspect is directed to a method of deploying a store from an aircraft with electrical power. The method may include operating a release arrangement carried by a housing carried by the aircraft to selectively release the store from the aircraft. The method may include operating an ejection arrangement carried by the housing to selectively eject the store away from the aircraft upon release of the store by the release arrangement. The ejection arrangement may include at least one electric motor carried by the housing, and a plurality of ejector pistons carried by the housing and movable between stored and ejection positions responsive to the at least one electric motor.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
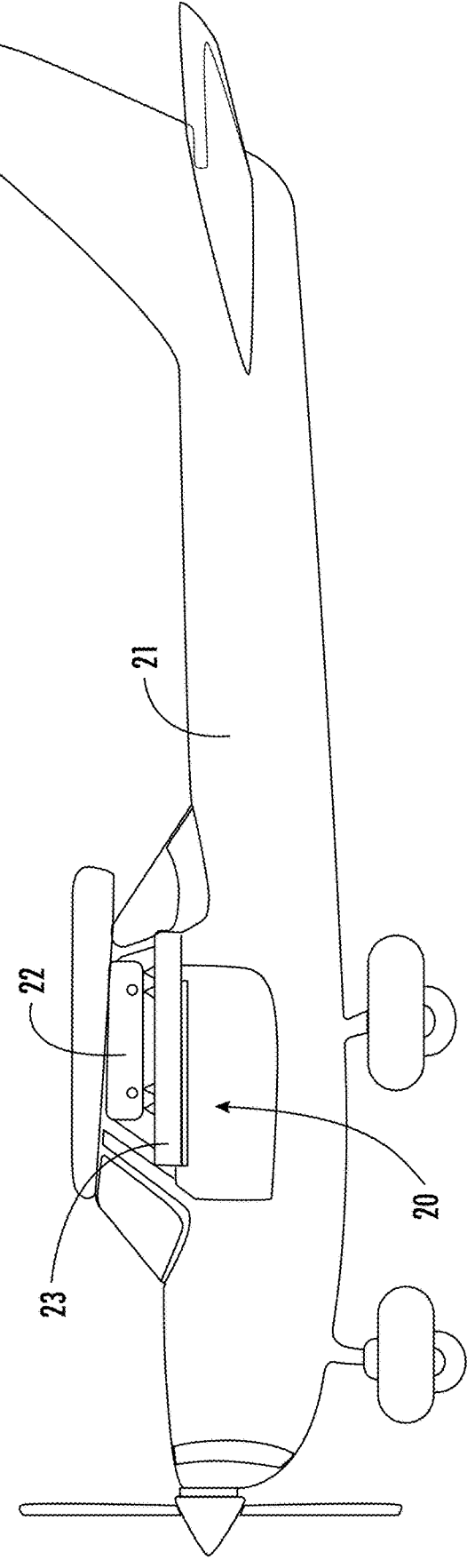
FIG. 1 is a schematic diagram of an aircraft including an electrically powered store deployment system in accordance with an embodiment.
Figure 2:
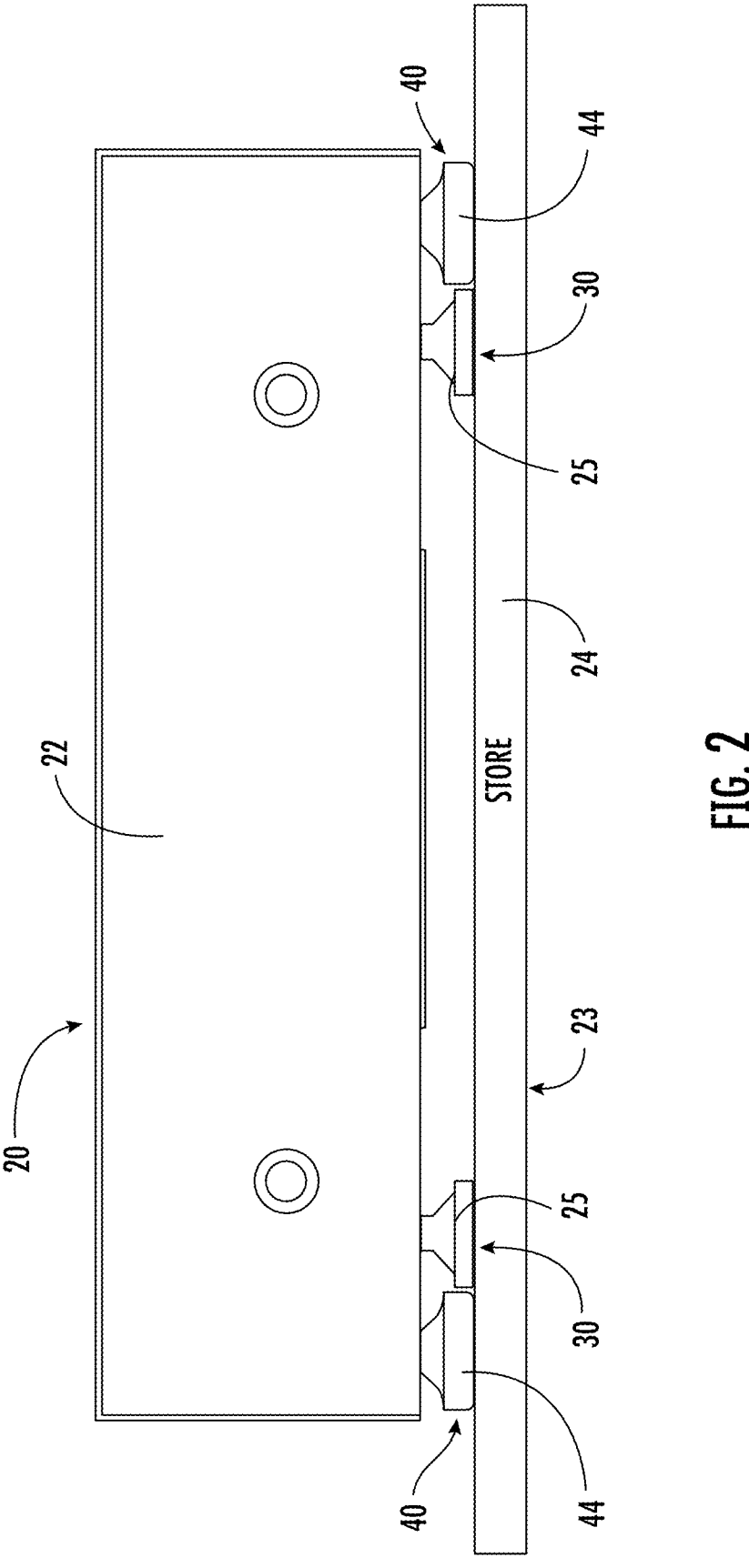
FIG. 2 is a side view of the electrically powered store deployment system of FIG. 1.
Figure 3:
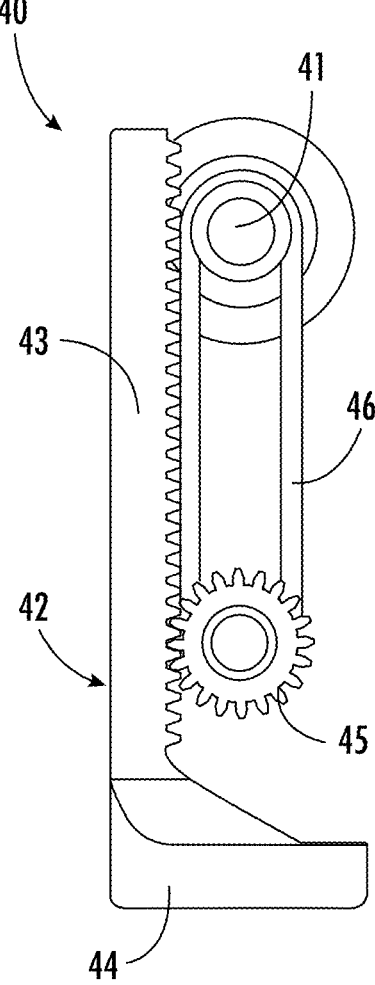
FIG. 3 is an enlarged side view of an exemplary ejection arrangement of the electrically powered store deployment system of FIG. 2.

Referring initially to FIG. 1, an electrically powered store deployment system 20 for an aircraft 21 is first described. The aircraft 21 is illustratively in the form of a manned aircraft, but those skilled in the art will appreciate that the aircraft may be manned or unmanned, and/or driven by any type of propulsion system (e.g., jet, propeller, rotor blade, rocket, etc.). In some embodiments, the aircraft 21 may not have a propulsion system, for example, similar to a glider.

Referring additionally to FIGS. 2-7, the electrically powered store deployment system 20 includes a housing 22 carried by the aircraft 21. The housing 22 is illustratively carried underneath and coupled to a wing of the aircraft 21. However, the housing 22 in some embodiments may not be carried underneath a wing, rather may be carried by a bottom fuselage of the aircraft, for example. The housing 22 has a bottom permitting a store 23 carried by the housing to be deployed from the bottom. As will be appreciated by those skilled in the art, a "store" on an aircraft, particularly in a military context, refers to any device or equipment intended for internal or external carriage and mounted on the aircraft's suspension and release equipment, whether or not intended to be separated in flight, for example, a missile, bomb, and/or other ordnance, powered or unpowered. The store 23 may include equipment or contents for other operations/applications as will also be appreciated by those skilled in the art.

Figure 4:
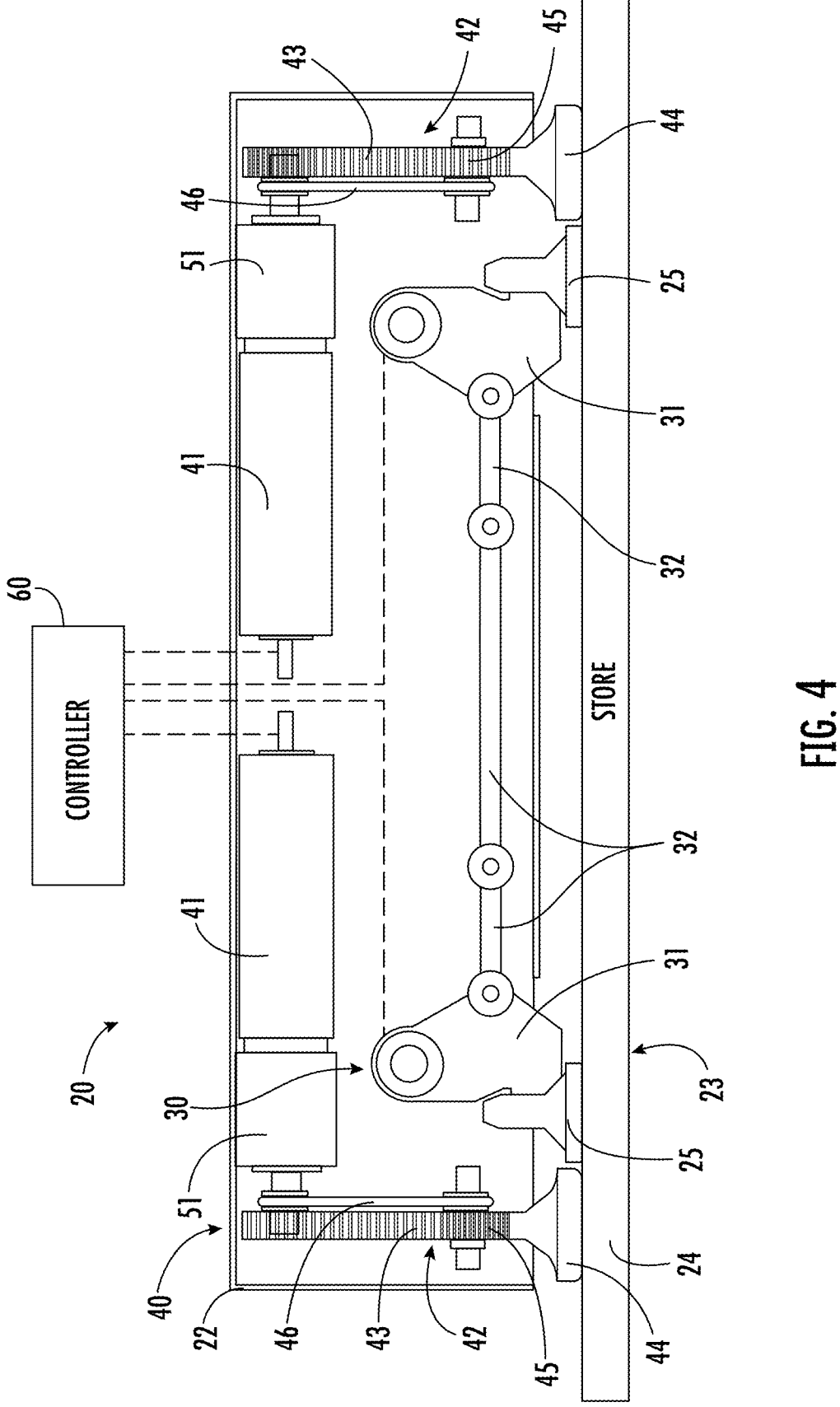
FIG. 4 is a side cutaway view of the electrically powered store deployment system of FIG. 2 with the ejection pistons in the stored position.
Figure 5:
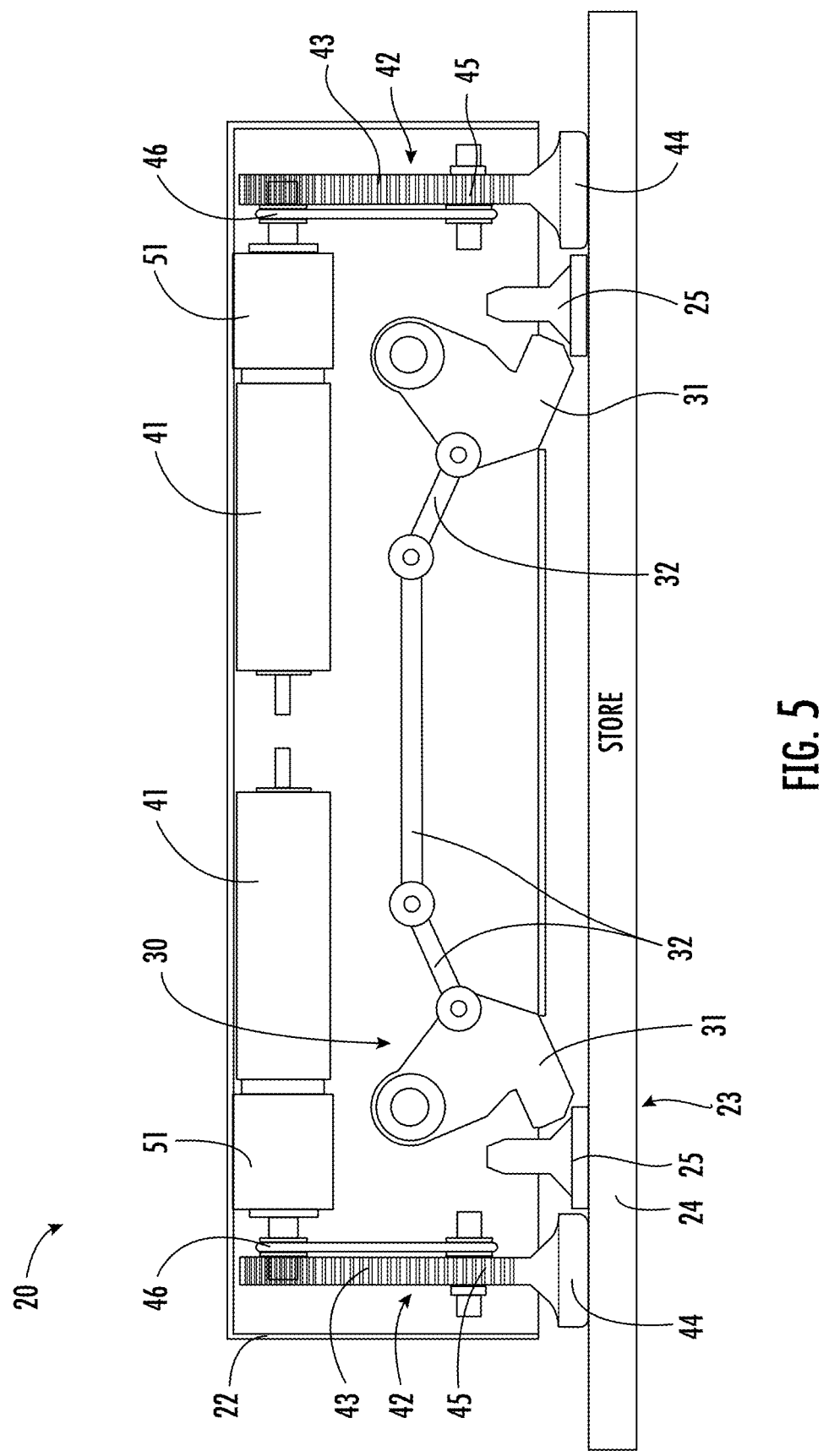
FIG. 5 is another side cutaway view of the electrically powered store deployment system of FIG. 2 with the ejection pistons in the stored position and with the store hooks disengaged.
Figure 6:
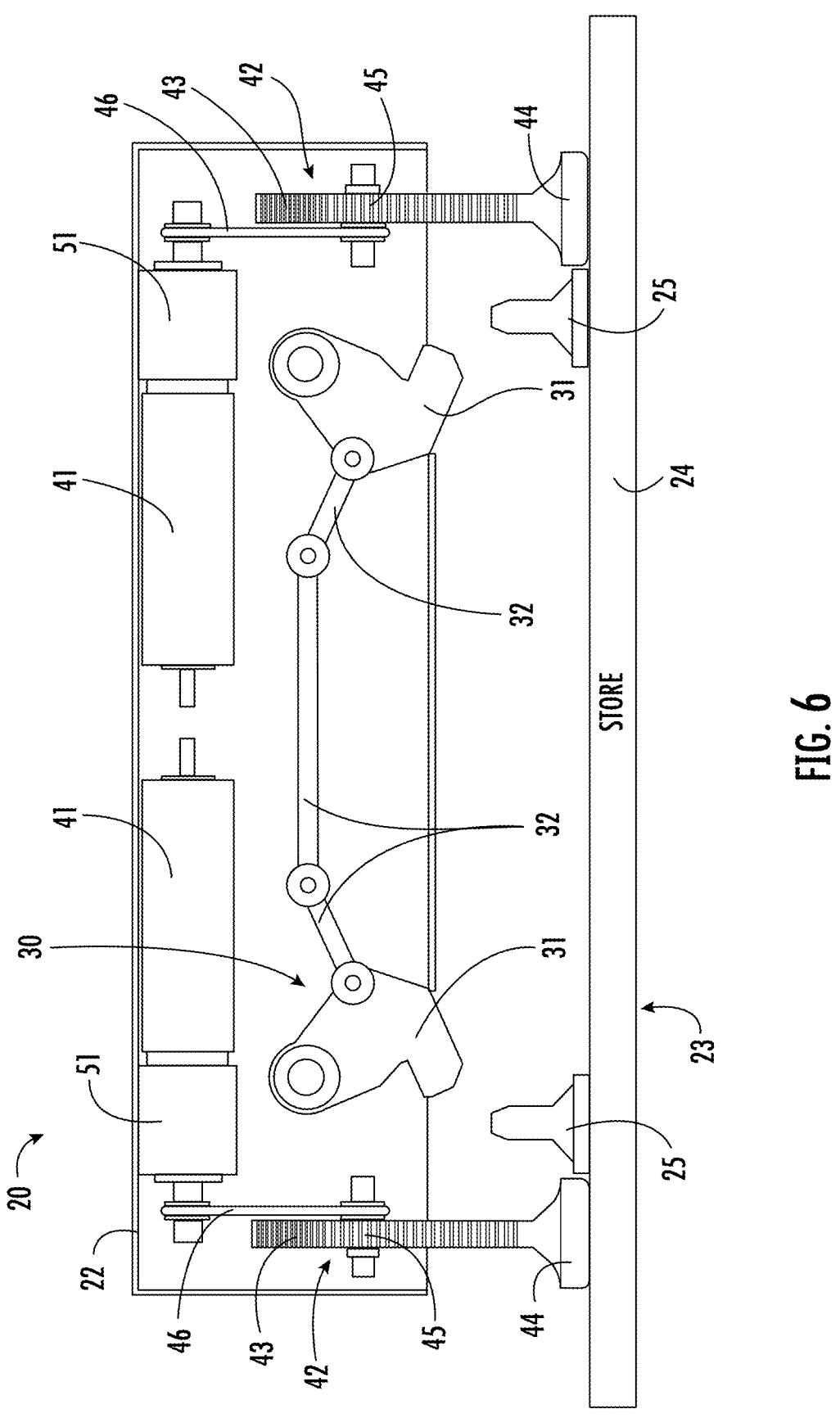
FIG. 6 is another side cutaway view of the electrically powered store deployment system of FIG. 2 with the ejection pistons partially extended during store deployment.

A release arrangement 30 is carried by the housing 22. The release arrangement 30 selectively releases the store 23 from the aircraft 21. More particularly, the store 23 includes a store body 24 and store hooks 25 carried by the store body. The release arrangement 30 includes rotatable locks 31 (e.g., in the form of hooks) coupled via the linkage 32. During carriage or storage of the store 23, the rotatable locks 31 engage the store hooks 25, and the linkage 32 operates to keep the rotatable locks engaged. Upon a desired release, the rotatable locks 31 are rotated (e.g., toward each other) to disengage the store hooks 25 (FIGS. 5-6). The rotatable locks 31 may be rotated by an electric motor, pneumatically, or hydraulically, for example, and controlled by a controller 60 (FIG. 4). The controller 60 may be carried by the aircraft 21 or remote from the aircraft, and/or may receive input from within the aircraft or remotely from the aircraft (e.g., from the ground). The controller 60 may include discrete circuitry or components, for example, wireless communications circuitry, actuators, etc., that cooperate to perform the operations to release the store 23 from the aircraft 21.

The electrically powered store deployment system 20 also includes an ejection arrangement 40 carried by the housing 22. The ejection arrangement 40 selectively ejects the store 23 away from the aircraft 21 upon release of the store by the release arrangement 30. The ejection arrangement 40 illustratively includes a pair of electric motors that are in the form of rotary electric motors 41. While there are two rotary electric motors 41 illustrated, those skilled in the art will recognize that there may be any number of rotary electric motors, including even a single rotary electric motor. Moreover, while rotary electric motors 41 are illustrated, the electric motors may be another type of electric motor, for example, as will be described in further detail below.

The rotary electric motors 41 are carried by the housing 22, for example, along the top side thereof. In an embodiment, a respective gear box 51 may be coupled (e.g., laterally in line with) the rotary electric motors 41. The gear boxes 51 may be each provide increased rotational speed for quicker operation of the ejection arrangement or quicker ejection of the store 23 away from the aircraft 21. The gear boxes 51 may lower the speed of the rotary electric motors 41, and increase to the torque, for example, while lowering the speed.

The ejection arrangement 40 also includes ejector pistons 42, illustratively a pair thereof, carried by the housing 22 adjacent opposite ends thereof and oriented transverse to the rotary electric motors 41. Each ejector piston 42 includes a toothed-shaft 43 and an enlarged head 44 coupled to the toothed-shaft. The enlarged head 44 is adjacent the store 23 in the stored position and provides a larger contact surface area with the store during ejection, as will described in further detail below. While a pair of ejector pistons 42 is illustrated, those skilled in the art will appreciate that there may be any number of ejector pistons, including one.

A drive gear 45 engages the toothed-shaft 43 and together therewith may define a rack-and-pinion arrangement. The drive gear 45 is carried by the housing 22 adjacent the opposite ends of the housing. A drive belt 46 is coupled between the shaft of the rotary electric motor 41 and the drive gear 45.

Accordingly, the ejector pistons 42 are movable between stored and ejection positions responsive to the rotary electric motors 41. Additionally, those skilled in the art will appreciate that the location or arrangement of the drive gear 45 relative to the rotary motor 41 permits the ejector pistons 42 to be movable to the ejection position while maintaining engagement between the toothed-shaft 43 and the drive gear 45. Moreover, while a toothed-shaft configuration has been described herein, in an embodiment, a toothed-shaft 43 may not be included, but rather, a direct coupling arrangement may be used.

Figure 7:
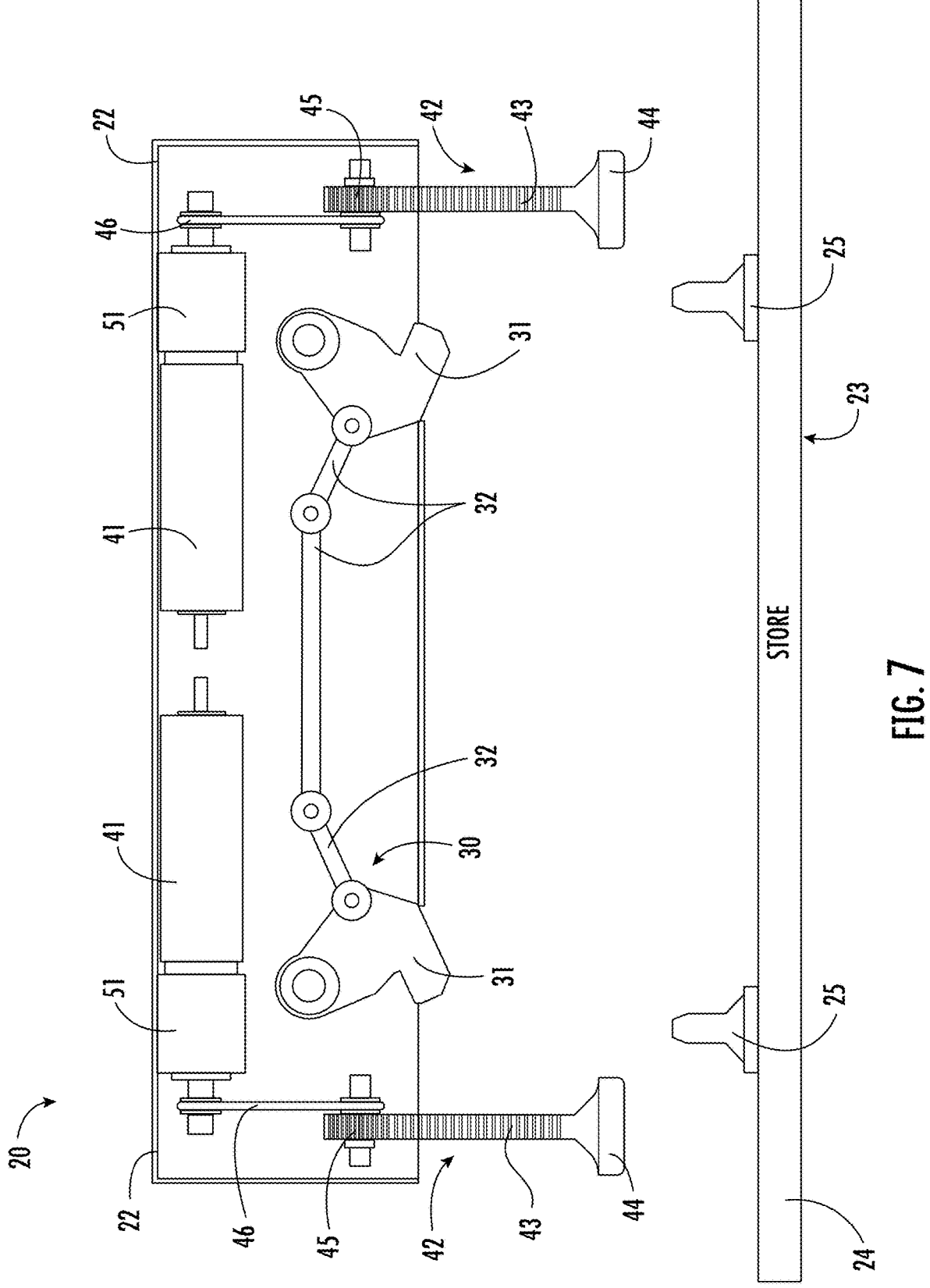
FIG. 7 is another side cutaway view of the electrically powered store deployment system of FIG. 2 with the ejection pistons in the extended position during store deployment.

During operation, for example, when desirous of releasing the store 23, the controller 60 may operate the rotary electric motors 41 that, via the drive belt 46 and the drive gear 45, move the ejector pistons 42 to the ejection or extended positions, pushing the store 23 away from the housing 22 (FIGS. 6-7). The controller 60 may be the same controller for operating the release arrangement 30 (FIG. 4). Of course, the controller 60 may be a different controller or discrete circuitry or components for performing operations related to the rotary electric motors 41. Operation of the ejection arrangement 40 may be simultaneous with operation of the release arrangement 30 (e.g., timed in coordination and synchronized with the release of the store hooks 25 from the locks 31). In some embodiments, particularly where the ejection arrangement 40 operates at a relatively high speed, the ejection arrangement may be operated upon operation of the release arrangement 30.

As will be appreciated by those skilled in the art, powering multiple ejector pistons 42 each with a dedicated motor 41 may permit a variable pitch rate of the ejected store. 23. Pitch rate generally refers to the angle of the store 23 relative to the aircraft 21 during a release. For example, for some stores 23 it may be desirable to be released "nose down", so the ejector piston 42 closer to that nose-side or forward of the aircraft 21 may apply greater force than the other ejector piston, aft-side. In some embodiments, a pitch rate may be achieved with one motor 41 driving multiple ejector pistons 42 (e.g., in the case of a linear motor, as will be described in further detail below), but it may be desirable to be a set rate using different gear/pulley ratios, for example, based upon a multi-speed transmission device.

The electrically powered store deployment system 20 may be particularly advantageous over other deployment techniques. For example, electrically powered ejection may offer relatively fast deployment (load and go) as compared to a pneumatic system, for example, which includes a pressure storage tank requiring time to pressurize. Also, relative to pneumatic systems, the electrically powered store deployment system 20 does not include the use of specialized equipment to fill and maintain gas pressure. In a pneumatic ejection system, filling or pressurizing to an operating pressure can delay aircraft deployment.

Additionally, unlike pyrotechnic ejection systems, the electrically powered store deployment system 20 does not involve regularly scheduled disassembly, cleaning, inspection, and component replacement. Safety may be increased as well as pyrotechnic ejection involves consideration for explosive charges.

Figure 8:
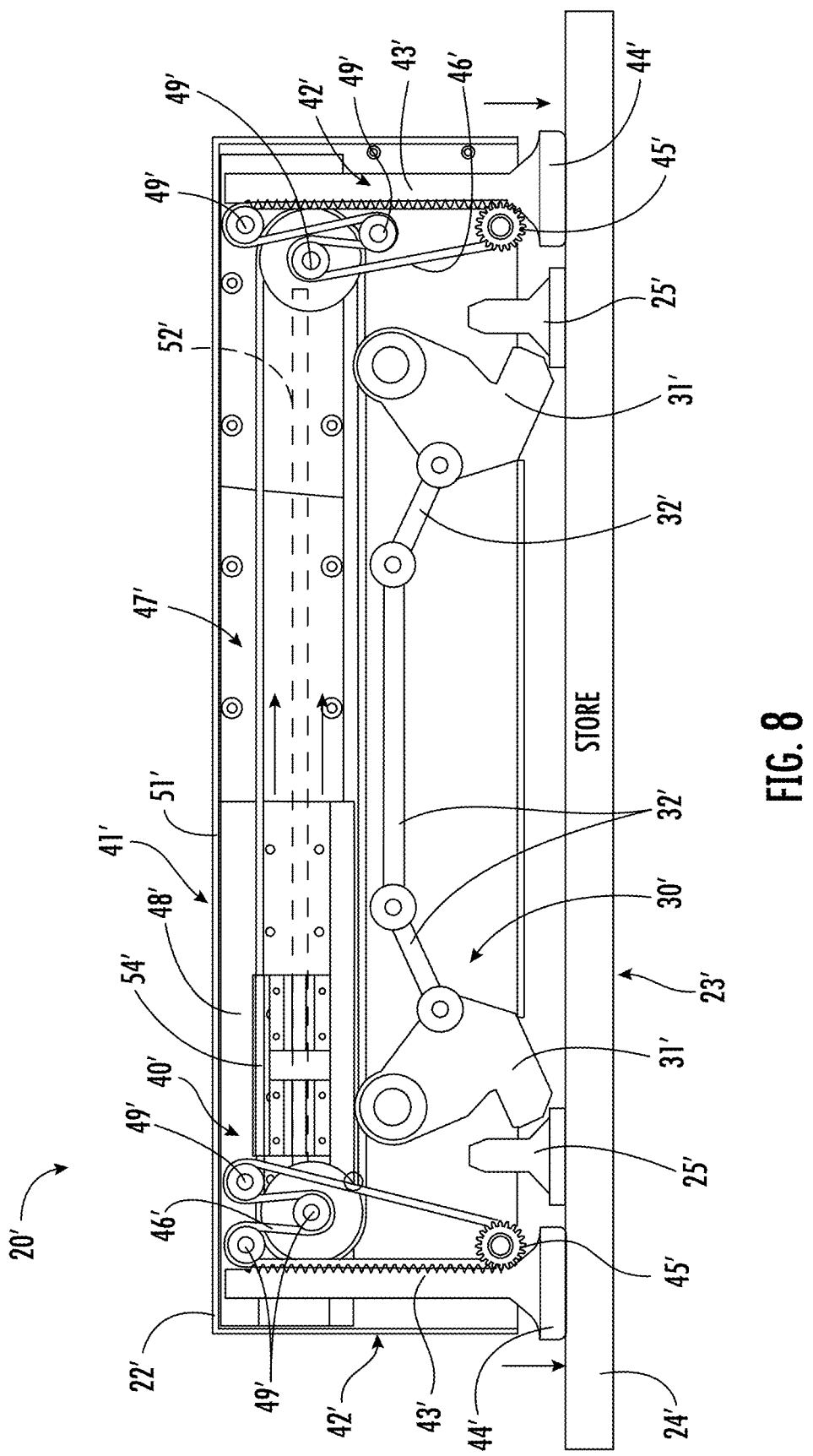
FIG. 8 is a side cutaway view of an electrically powered store deployment system in accordance with another embodiment.
Figure 9:
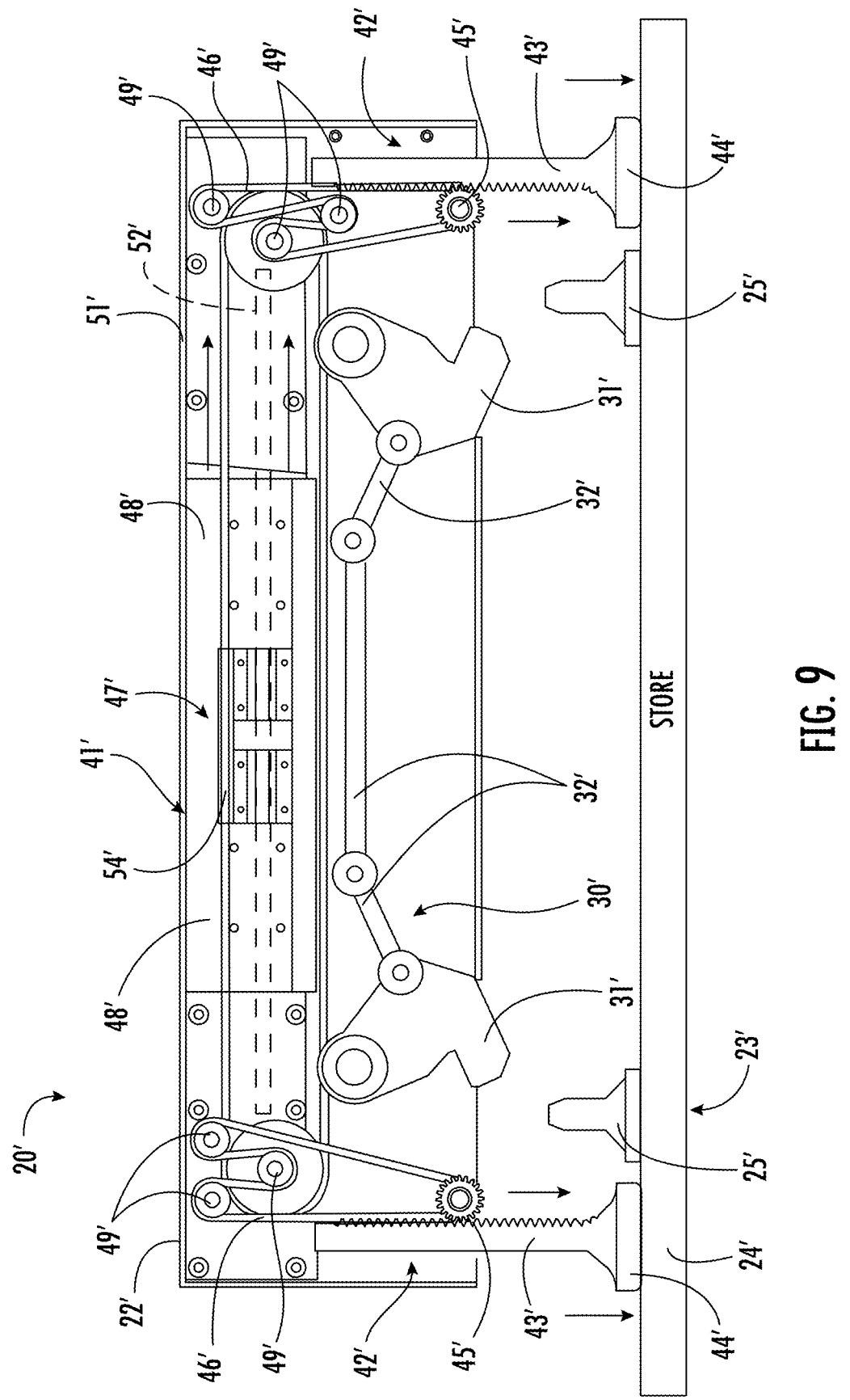
FIG. 9 is another side cutaway view of the electrically powered store deployment system of FIG. 8 with the ejection pistons partially extended during store deployment.
Figure 10:
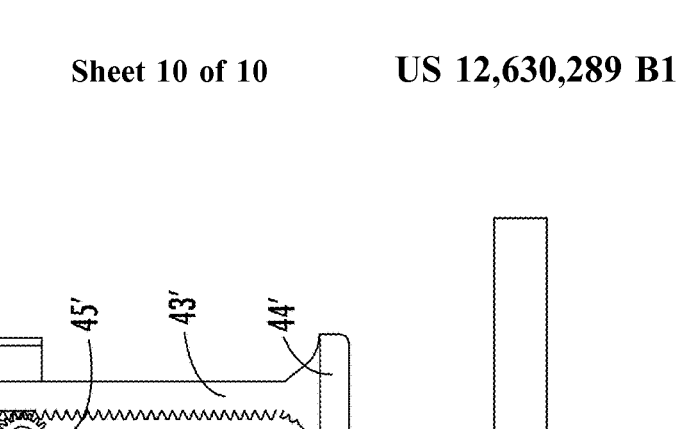
FIG. 10 is another side cutaway view of the electrically powered store deployment system of FIG. 8 with the ejection pistons in the extended position during store deployment.

Referring now to FIGS. 8-10, in another embodiment of the electrically powered store deployment system 20', rather than rotary electric motors, the electric motors may be in the form of a linear electric motor 41'. Similar to the embodiments described above, while a single linear electric motor 41' is illustrated, there may be more than one linear electric motor in other embodiments.

The linear electric motor 41' may include a fixed track 47' and a movable shuttle 48' carried by the fixed track. The housing 22' may include a cover or sidewall that includes a surface feature 52' (e.g., protrusion or recess therein) that defines the fixed track 47' or a portion thereof to serve as a transport guide for the movable shuttle 48'.

The fixed track 47' may include a magnetic track 51' (i.e., stator) that is positioned on the top and bottom of the movable shuttle 48'. The magnetic track 51' may be defined by permanent magnets or an electromagnetic coil plate, as will be appreciated by those skilled in the art. The movable shuttle 48' includes magnetic material (i.e., rotor).

Similarly to the above-described embodiments, a respective drive gear 45' engages the toothed-shaft 43' of each of the two ejector pistons 42'. However, in contrast to the above-described embodiments, a respective pulley arrangement 49' (e.g., in the form of a 3:1 compound pulley) is adjacent each opposing end of the fixed track 47'. The pulley arrangement 49' is coupled to each drive gear 45' by way of a drive belt 46'. In other words, the drive belt 46' is coupled between the movable shuttle 48' and the respective pulley arrangements 49' and, more particularly, the drive belt 46' is coupled to (e.g., secured by way of an attachment plate 54') to the movable shuttle so that the drive belt is driven by the movable shuttle. Other elements illustrated, but not specifically described, for example, the ejection arrangement 40', the store 23', store body 24', store hooks 25', release arrangement 30', rotatable locks 31', and linkage 32', are similar to those described in the embodiments above. The pulley arrangement 49' may be in the form of a different ratio compound pulley and/or may be a different pulley arrangement other than the exemplary arrangement in illustrated embodiments.

A method aspect is directed to a method of deploying a store 23 from an aircraft 21 with electrical power. The method includes operating a release arrangement 30 carried by a housing 22 carried by the aircraft 21 to selectively release the store 23 from the aircraft. The method may include operating an ejection arrangement 40 carried by the housing 22 to selectively eject the store 23 away from the aircraft 21 upon release of the store by the release arrangement 30. The ejection arrangement 40 may include at least one electric motor 41 carried by the housing 22, and a plurality of ejector pistons 42 carried by the housing and movable between stored and ejection positions responsive to the at least one electric motor.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electrically powered store deployment system for an aircraft, comprising:
   a housing to be carried by the aircraft;
   a release arrangement carried by the housing and configured to selectively release a store from the aircraft; and
   an ejection arrangement carried by the housing and configured to selectively eject the store away from the aircraft upon release of the store by the release arrangement;
   the ejection arrangement comprising
   at least one electric motor carried by the housing, and
   at least one ejector piston carried by the housing and mechanically coupled to the at least one electric motor, the at least one ejector piston mechanically driven between stored and ejection positions by the at least one electric motor.

2. The electrically powered store deployment system of claim 1 comprising a controller coupled to the release arrangement and the ejection arrangement.

3. The electrically powered store deployment system of claim 1 wherein the store comprises a store body and at least one hook carried by the store body; and wherein the release arrangement is configured to engage and release the at least one hook.

4. The electrically powered store deployment system of claim 1 wherein the at least one electric motor comprises at least one rotary electric motor.

5. The electrically powered store deployment system of claim 4 wherein the at least one ejector piston comprises a toothed-shaft and an enlarged head coupled thereto; and wherein the ejection arrangement comprises a drive gear engaging the toothed-shaft, and a drive belt coupled between the at least one rotary electric motor and the drive gear.

6. The electrically powered store deployment system of claim 5 wherein the at least one ejector piston comprises a pair of ejector pistons, and the at least one rotary electric motor comprises a pair of rotary electric motors.

7. The electrically powered store deployment system of claim 1 wherein the at least one electric motor comprises at least one linear electric motor.

8. The electrically powered store deployment system of claim 7 wherein the at least one ejector piston comprises a pair of ejector pistons; and wherein the at least one linear electric motor comprises a single linear electric motor.

9. The electrically powered store deployment system of claim 8 wherein the single linear motor comprises a fixed track and a movable shuttle carried thereby.

10. The electrically powered store deployment system of claim 9 wherein each ejector piston comprises a toothed-shaft and an enlarged head coupled thereto; and wherein the ejection arrangement comprises:
   a respective drive gear engaging each corresponding toothed-shaft;

a respective pulley arrangement adjacent each opposing end of the fixed track and coupled to each corresponding drive gear; and a respective drive belt coupled between the movable shuttle and each corresponding pulley arrangement.

11. An electrically powered store deployment system for an aircraft, comprising:

a housing to be carried by the aircraft;

a release arrangement carried by the housing and configured to selectively release a store from the aircraft; and an ejection arrangement carried by the housing and configured to selectively eject the store away from the aircraft upon release of the store by the release arrangement;

the ejection arrangement comprising at least one electric motor carried by the housing, a plurality of ejector pistons carried by the housing and movable between stored and ejection positions responsive to the at least one electric motor, each ejector piston comprising a toothed-shaft and an enlarged head coupled thereto, a respective drive gear engaging each corresponding toothed-shaft, and a respective drive belt coupled between the at least one electric motor and each corresponding drive gear.

12. The electrically powered store deployment system of claim 11 wherein the at least one electric motor comprises at least one rotary electric motor.

13. The electrically powered store deployment system of claim 12 wherein the plurality of ejector pistons comprises a pair of ejector pistons, and the at least one rotary electric motor comprises a pair of rotary electric motors.

14. The electrically powered store deployment system of claim 11 wherein the at least one electric motor comprises at least one linear electric motor.

15. The electrically powered store deployment system of claim 14 wherein the plurality of ejector pistons comprises a pair of ejector pistons; and wherein the at least one linear electric motor comprises a single linear electric motor.

16. The electrically powered store deployment system of claim 15 wherein the single linear motor comprises a fixed track and a movable shuttle carried thereby.

17. The electrically powered store deployment system of claim 16 wherein the ejection arrangement comprises a respective pulley arrangement adjacent each opposing end of the fixed track and coupled to each corresponding drive gear; and wherein the respective drive belt is coupled between the movable shuttle and each corresponding pulley arrangement.

18. A method of deploying a store from an aircraft with electrical power, the method comprising:

operating a release arrangement carried by a housing carried by the aircraft to selectively release the store from the aircraft; and operating an ejection arrangement carried by the housing to selectively eject the store away from the aircraft upon release of the store by the release arrangement, the ejection arrangement comprising at least one electric motor carried by the housing, and a plurality of ejector pistons carried by the housing and mechanically coupled to the at least one electric motor, the plurality of ejector pistons mechanically driven between stored and ejection positions by the at least one electric motor.

19. The method of claim 18 wherein the at least one electric motor comprises at least one rotary electric motor.

20. The method of claim 19 wherein each ejector piston comprises a toothed-shaft and an enlarged head coupled thereto; and wherein the ejection arrangement comprises a respective drive gear engaging each corresponding toothed-shaft, and a respective drive belt coupled between the at least one rotary electric motor and each corresponding drive gear.

21. The method of claim 20 wherein the plurality of ejector pistons comprises a pair of ejector pistons, and the at least one rotary electric motor comprises a pair of rotary electric motors.

22. The method of claim 18 wherein the at least one electric motor comprises at least one linear electric motor.

23. The method of claim 22 wherein the plurality of ejector pistons comprises a pair of ejector pistons; and wherein the at least one linear electric motor comprises a single linear electric motor.

24. The method of claim 23 wherein the single linear motor comprises a fixed track and a movable shuttle carried thereby.

25. The method of claim 24 wherein each piston comprises a toothed-shaft and an enlarged head coupled thereto; and wherein the ejection arrangement comprises:

a respective drive gear engaging each corresponding toothed-shaft;

a respective pulley arrangement adjacent each opposing end of the fixed track and coupled to each corresponding drive gear; and a respective drive belt coupled between the movable shuttle and each corresponding pulley arrangement.

* * * * *